July 19, 1966 A. J. PAGAN 3,261,529
WELDING BACK-UP DEVICE

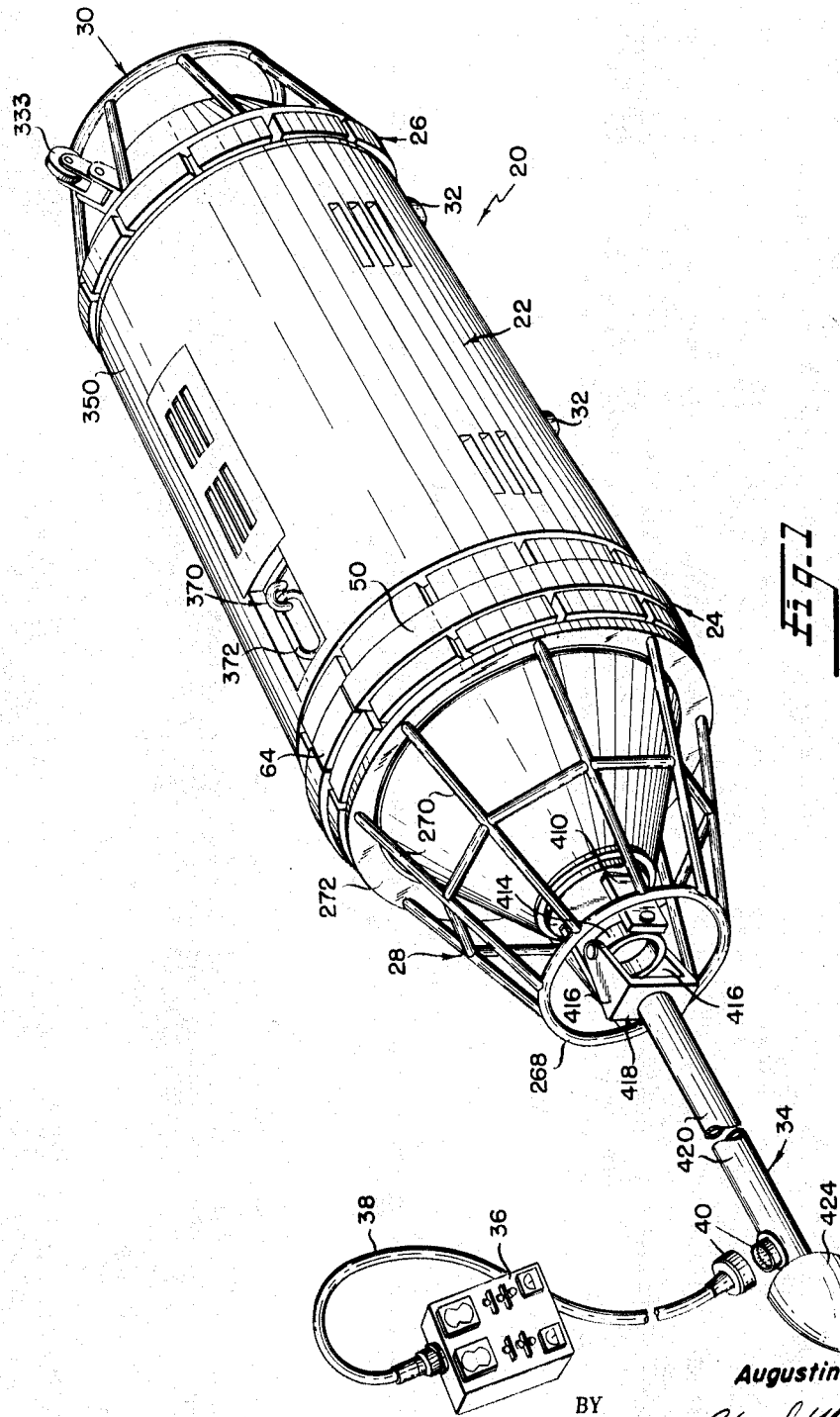

Filed May 21, 1963 7 Sheets-Sheet 2

INVENTOR
*Augustine J. Pagan*

BY

ATTORNEYS

July 19, 1966 A. J. PAGAN 3,261,529
WELDING BACK-UP DEVICE
Filed May 21, 1963 7 Sheets-Sheet 3
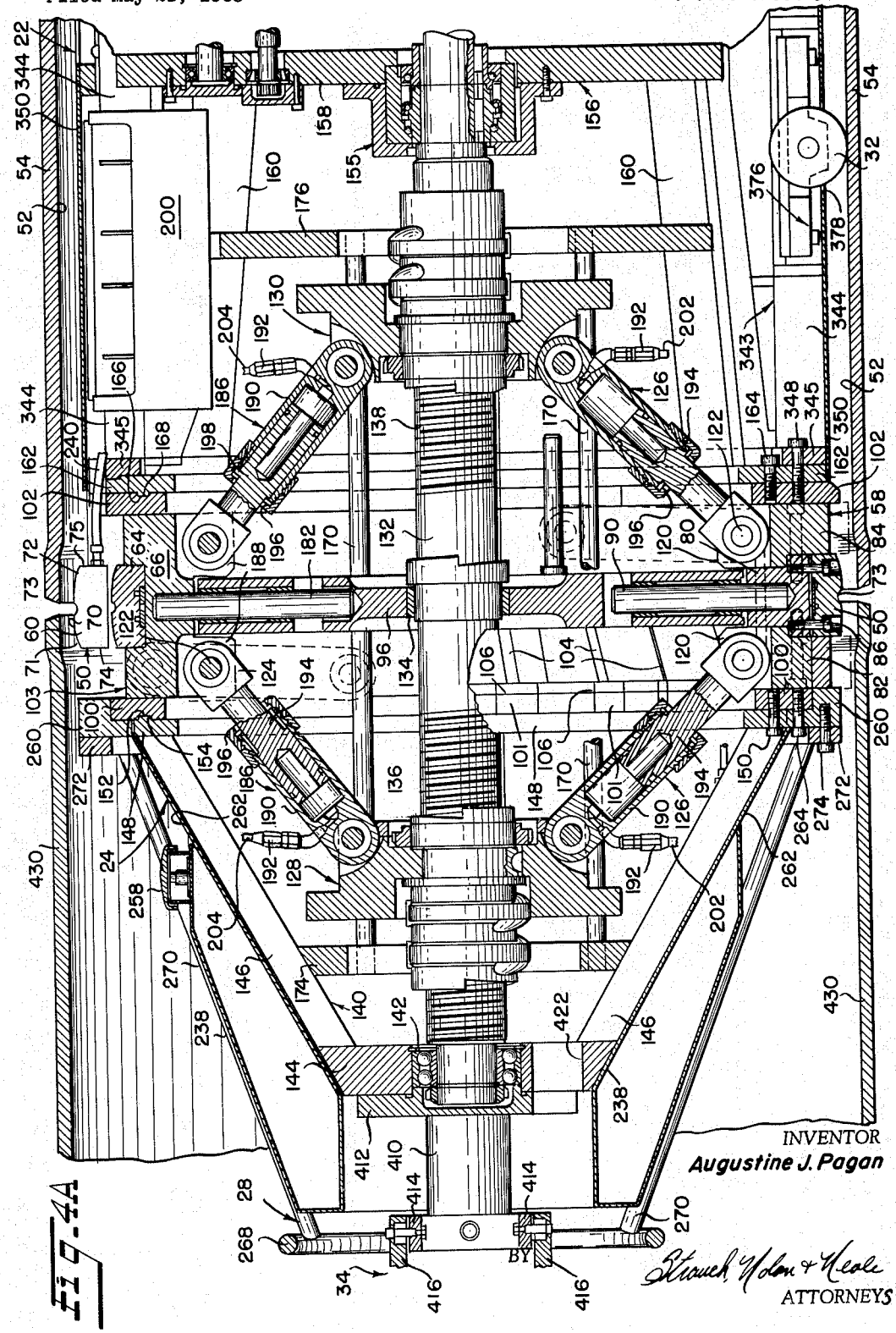
INVENTOR
Augustine J. Pagan
BY
Kane, Dalsimer & Neale
ATTORNEYS

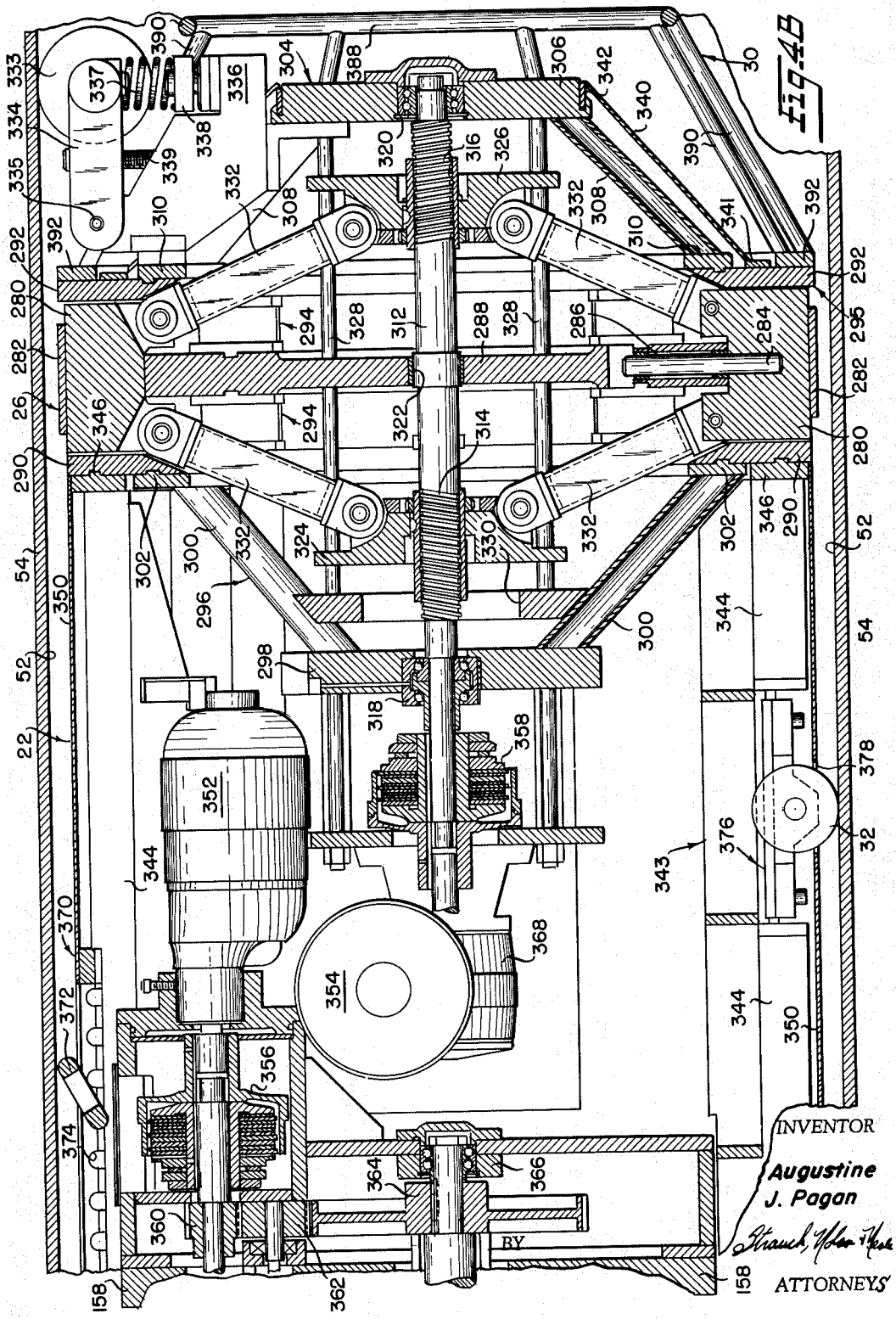

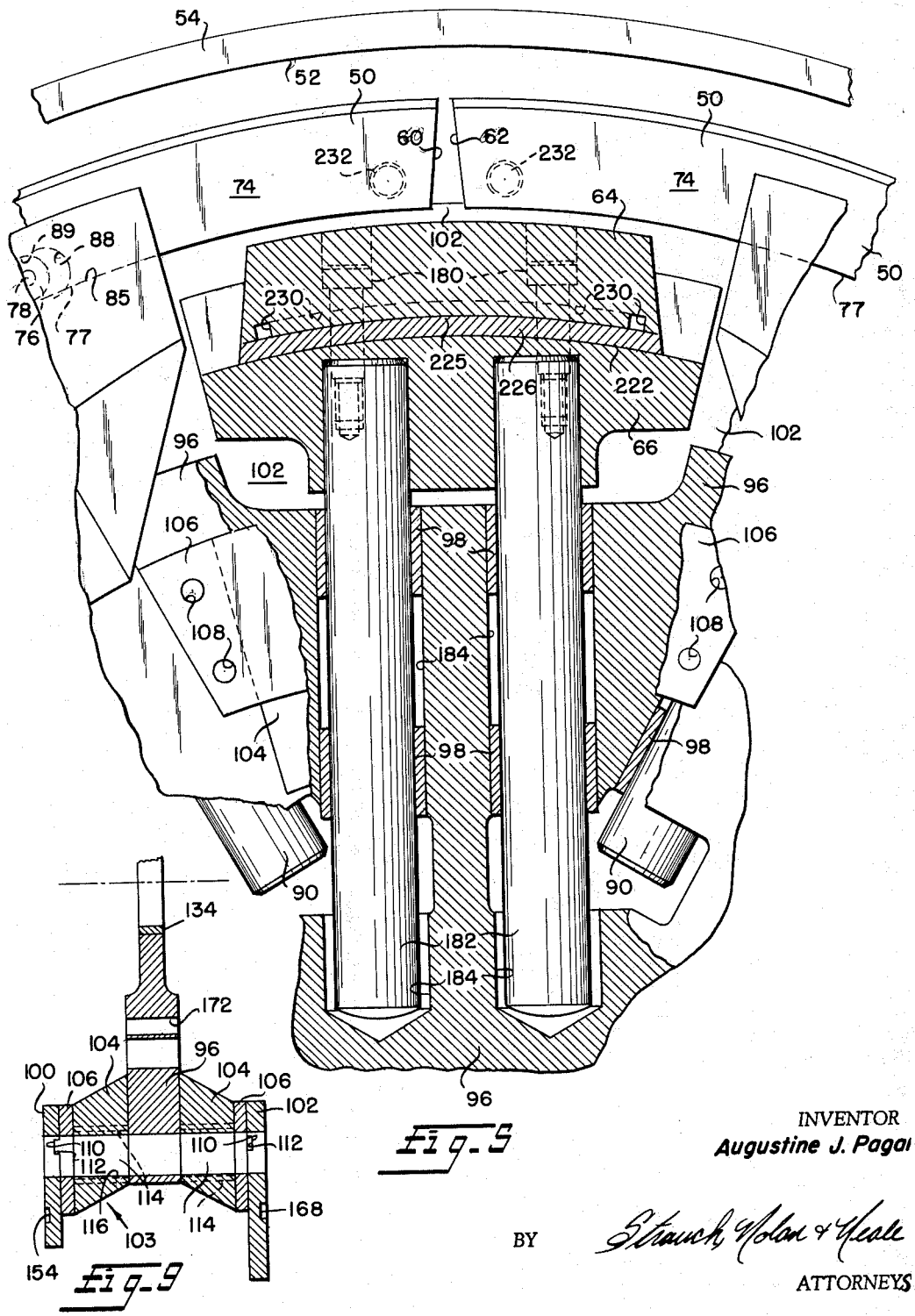

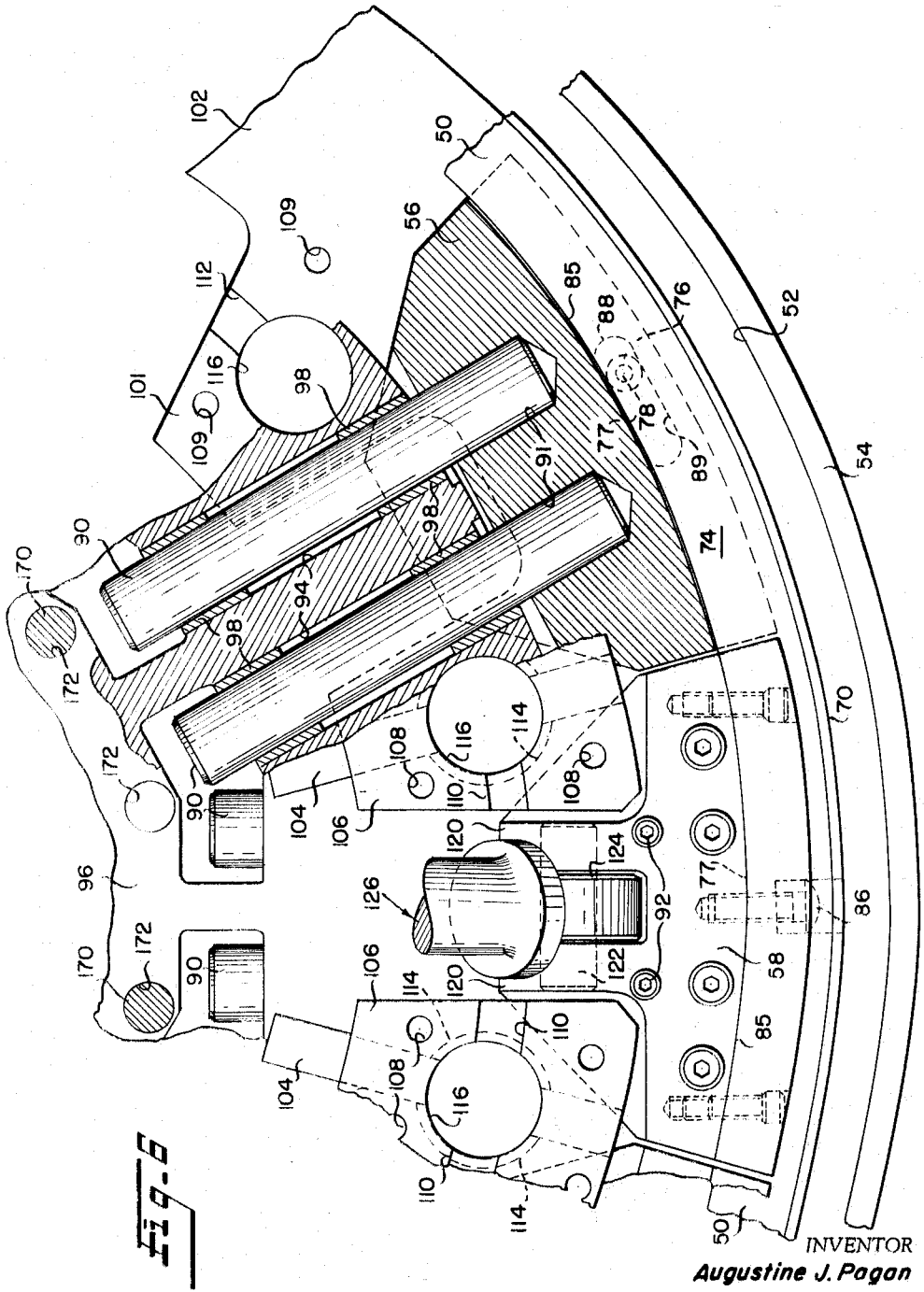

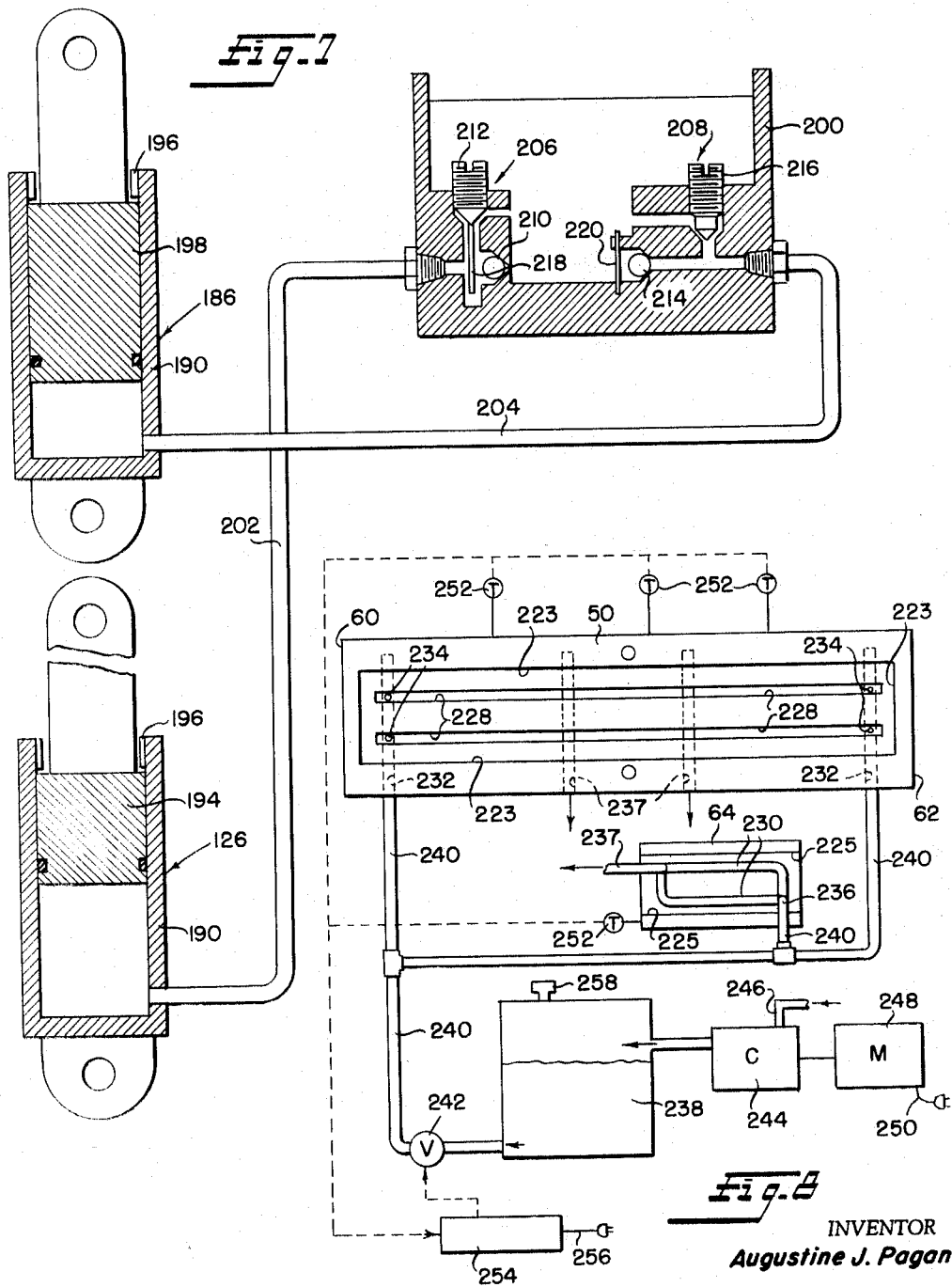

United States Patent Office 3,261,529
Patented July 19, 1966

3,261,529
WELDING BACK-UP DEVICE
Augustine J. Pagan, El Cajon, Calif., assignor, by mesne assignments, to American Machine & Foundry Company, New York, N.Y., a corporation of New Jersey
Filed May 21, 1963, Ser. No. 282,066
12 Claims. (Cl. 228—50)

This invention relates to methods and apparatus for aligning adjacent ends of pipe sections preparatory to and during girth welding and particularly to methods and apparatus for aligning and clamping such sections while providing back-up support for weld metal to be introduced therebetween.

In the construction of pipelines, it is customary to position pipe sections adjacent the open or free end of the completed portion of the pipeline and then to girth weld the pipe section to the pipeline with an internal clamp or alignment device expanded inside the pipe to ensure proper alignment of the pipe ends. Upon completion of the girth weld, the internal alignment device is released and moved to the other end of the pipe section preparatory to a subsequent weld thereat.

As shown by United States Letters Patent No. 2,638,069 to Mearns, such internal-pipe-section-alignment devices commonly have two adjacent sets of circumferentially disposed pipe contacting members which are adapted for radial expansion to contact the respective interior surfaces of the pipeline and the pipe section. The two adjacent circumferential mechanisms are secured together so that, upon radial expansion thereof, they are effective to generally align the pipe ends. The Mearns device does not provide any back-up support for the weld to be formed.

As shown by United States Letters Patent No. 2,780,194 to Croswell, it is further known to provide an internal alignment device having a single set of circumferentially disposed alignment members or shoes which are adapted for radial expansion to contact the adjacent ends of the pipeline and the pipe section. This type of alignment device not only serves to align the adjacent pipe ends but also supports the molten weld metal introduced at the pipe joint during the welding operation. To prevent the molten weld metal from sticking or adhering to the expansible alignment members, a flexible inert backing strip of unspecified composition is disposed upon the alignment members directly under the weld.

This arrangement has the following disadvantages, however. A bevel joint between adjacent radially movable expansion shoes is a point of weakness in the alignment and back-up mechanism, and in the Croswell arrangement, such joints occur at a plurality of points around the circumference of the alignment device. Further, an inert material suitable to prevent adhesion of the molten weld metal to the shoes also functions to restrict the flow of heat thereto from the molten weld metal. The resulting lack of dissipation of heat from the weld produces an undesirable sticking between the pipeline weld and the alignment mechanism. Finally, it is desirable to position an alignment mechanism such as that shown by Croswell so that one half of its pipe contacting surface extends from the open end of the pipeline prior to positioning the pipe section adjacent thereto. However, during final positioning of the pipe section, the pipe is very apt to forcibly strike those portions of the alignment mechanism which protrude from the pipeline, thus overcoming the slight pre-clamping action of the spring loaded studs of Croswell and axially displacing the alignment mechanism. If this happens, the alignment mechanism will not function as intended.

Accordingly, a primary object of the present invention is to provide novel methods and apparatus for effecting weld back-up and alignment of adjacent ends of pipe sections in an improved manner obviating the disadvantages of the prior art.

In order to accomplish this object, the present invention provides a back-up expander having, in its preferred form, an integral, C-shaped back-up ring which, in a collapsed condition with the ends of the C-shaped ring closely adjacent each other, has a diameter somewhat less than the internal diameter of the pipeline. Radially movable shoes are provided to expand this C-shaped ring into contact with the interior surface of a major portion of the circumference of the pipe. A ring segment is provided to fit within the gap that develops between the ends of the C-shaped ring during expansion thereof so as to complete the circumferential contact with the pipe interior. The ring shoes and the ring segment are moved radially outwardly by a plurality of hydraulically extensible links all connected and operated by the same mechanical actuator to ensure proper sequential operation of the ring and the ring segment.

In order to dissipate the heat of the molten weld metal so that it will not stick to the ring or ring segment, a boilable medium such as water is injected into the ring and ring segment.

Further, to secure the back-up expander in proper position at the end of the pipeline prior to the positioning of a pipe section adjacent thereto, a plurality of circumferentially disposed brake shoes are located at an axially spaced position on the expander. These brake shoes may be moved radially outward independently of the ring and ring segment to securely contact the inside of the pipeline.

Accordingly, other objects of the present invention include:

(1) The provision of novel, improved back-up expanders for pipeline welding;

(2) The provision of novel back-up expanders having fluid cooling means to dissipate the heat of the welding operation through the novel use of the fluid's latent heat of vaporization;

(3) The provision of novel internal alignment devices for pipeline sections having brake shoes for clamping the device in a pipeline section prior to an alignment operation;

(4) The provision of novel pipeline alignment devices which have elongated control handles adapted to slide through a pipeline section being positioned adjacent the open end of the pipeline;

(5) The provision of improved internal expanders for pipeline construction which have C-shaped rings to contact and align the pipeline sections;

(6) The provision of expanders in accordance with the preceding object together with ring sections adapted to fit in the gap developed during expansion of the C-shaped rings;

(7) The provision, in pipeline alignment devices, of improved circumferential expansion means;

(8) The provision, in pipeline alignment devices, of improved apparatus for sequentially expanding circumferentially disposed alignment means;

(9) The provision of improved methods for securely positioning alignment devices in pipelines;

(10) The provision of improved methods of providing back-up support for molten weld metal during girth welding of a pipeline;

(11) The provision of improved methods of aligning pipeline sections to be joined.

These and other objects of the present invention will more fully appear from the following description and the appended claims when read in conjunction with the accompanying drawing, wherein:

FIGURE 1 is an overall perspective view of the preferred form of back-up expander of the present invention;

FIGURE 4A is a vertical, longitudinal section through the back-up expander and shows the front, or back-up ring, end of the device;

FIGURE 4B is a continuation of the section of FIGURE 4A and shows the rear, or brake shoe, end of the back-up expander;

FIGURE 5 is a fragmentary transverse section through the ring segment of the back-up expander;

FIGURE 6 is a fragmentary transverse section through the lower portion of the C-shaped ring of the back-up expander;

FIGURE 7 is a schematic illustration of the hydraulic control system of the back-up expander;

FIGURE 8 is a schematic illustration of the fluid cooling system of the back-up expander and includes a developed view of the coolant passages in the ring and ring segment;

FIGURE 9 is a fragmentary longitudinal section showing the central shoe supporting structure of a back-up ring assembly employed in the back-up expander.

Figure 3:
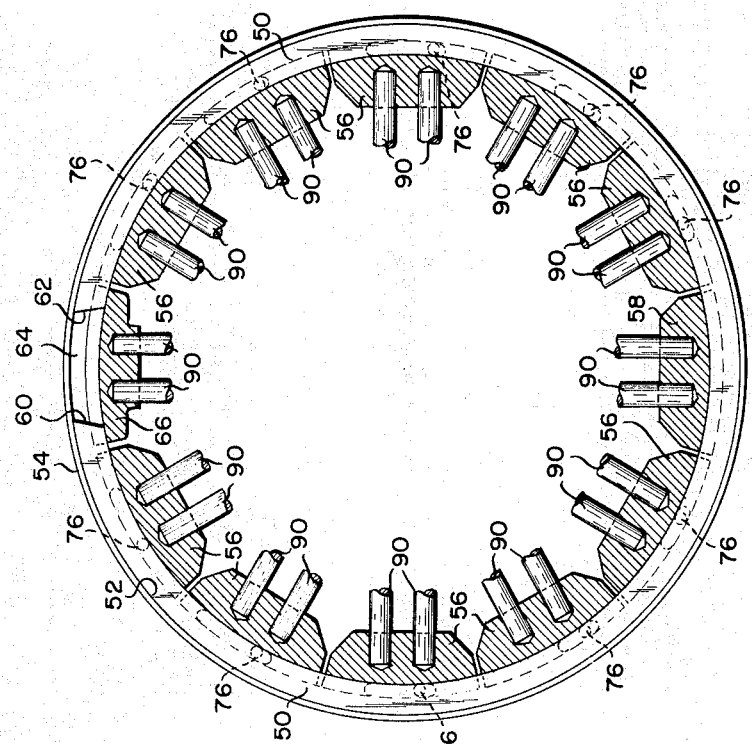
FIGURE 3 is a transverse section similar to FIGURE 2 but shows the expanded, pipe aligning condition of the back-up expander.
Figure 2:
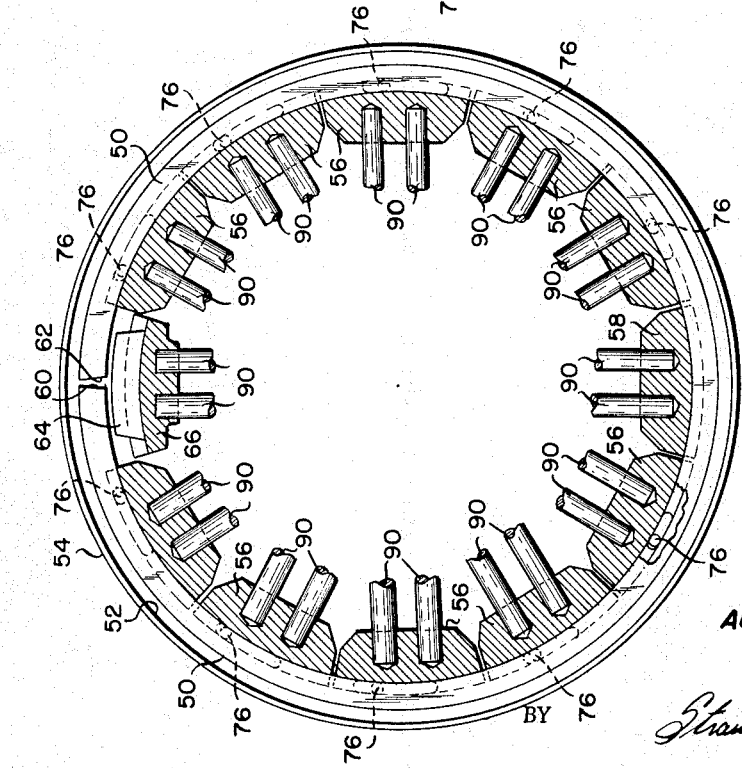
FIGURE 2 is a simplified transverse section showing the back-up expander of FIGURE 1 in a pipeline in a contracted condition.

As generally shown in FIGURES 1 to 3, back-up expander 20 includes a cylindrical central body portion 22 having a back-up ring assembly 24 at one end and a brake assembly 26 at the other. Generally conical protective cages 28 and 30 extend from assemblies 24 and 26 over the front and rear ends of the back-up expander, respectively. The expander 20 is adapted to roll along the bottom of the interior surface of a pipe on two radially spaced sets of longitudinally aligned wheels 32 (one set only is shown in FIGURE 1). An elongated control handle assembly 34 is universally mounted on the front end of the back-up expander to extend through a pipe section being joined to the pipeline. Handle assembly 34 may be employed to move the back-up expander through the pipeline and to house control leads to the expander's operating components. A suitable control box 36, provided with a power input (not shown), is removably connected to control handle assembly 34 by cable 38 and plug 40.

In use, back-up expander 20 aligns, expands, and clamps the adjacent ends of pipeline sections and provides back-up support for molten metal introduced between the ends of the sections in the welding process. These functions are accomplished by expanding a solid, copper, C-shaped, back-up ring 50 into contact with the interior surfaces of the pipeline sections to be joined with the ring bridging the gap between the sections (one pipeline section having an interior surface 52 is identified by reference character 54 in FIGURES 2 and 3). The expansion of the C-shaped ring 50 is accomplished by radially movable shoes 56 which are in sliding contact with the ring and a bottom shoe 58 to which ring 50 is anchored midway between its ends 60 and 62. As the shoes 56 and 58 move radially outwardly to expand ring 50 into contact with pipeline 54, the ends 60 and 62 move apart circumferentially. To fill the gap that develops between ends 60 and 62, a plug or ring segment 64 is moved radially outwardly by a shoe 66 from a position within the contracted location of ring 50 (FIGURE 2) to a position between the ends thereof (FIGURE 3) to complete the circumferential contact between back-up expander 20 and pipeline 54.

*Back-up ring assembly 24*

As shown in greater detail in FIGURES 4A, 5 and 6, the C-shaped back-up ring 50 has a generally rectangular cross section. The ring is preferably rolled from straight stock and has a C-shaped configuration with a normal, relaxed diameter equal to the inside diameter of the pipeline. That is, the back-up ring normally assumes the expanded configuration shown in FIGURES 1 and 3. The back-up ring may also be a built up, laminated structure fabricated of laminations rolled separately and subsequently joined together.

The outer cylindrical surface 70 of back-up ring 50 and ring segment 64 have front and rear circumferential, shallow grooves 73. The front face 74 and the rear face 75 of the ring are provided at spaced intervals with rollers 76 (FIGURES 5 and 6) tangential to the inner ring surface 77 and rotatably mounted upon pins 78 threaded into the front and rear faces of the ring.

The radially movable shoes upon which C-shaped ring 50 is mounted are of a built-up construction, as shown exemplarily for the bottom shoe 58 in FIGURE 4A. Shoe 58 includes a central shoe member 80, a two-piece front shoe member 82, and a rear shoe member 84. The various shoe members are interconnected by machine screws to form a rigid shoe unit and cooperate to support the inner ring surface 76 and the front and rear ring faces 74 and 75.

The outer cylindrical surfaces 85 of shoes 56 and 58 have a curvature such that they fit against and fully support the inner surface 77 of the back-up ring in the expanded condition. In the contracted condition of the ring, the curvature of the ring increases and there is a greater clearance between the ring and the shoes at the circumferential mid-portions of the shoes than at the ends thereof, as best shown in FIGURE 6.

Back-up ring 50 is anchored to the bottom shoe 58 by radially extending machine screws 86 to prevent tangential movement of the ring relative to the shoes. Screws 86 are installed to permit a small amount of radial movement (FIGURES 4A and 6) between the ring 50 and shoe 58 to permit the above-described flexing and change in clearance therebetween.

The remaining ring shoes, ten in the specific embodiment illustrated, each have roller slots 88 (FIGURES 5 and 6) in both their front and rear shoe members. Slots 88 are slightly wider than rollers 76 and permit the latter to freely roll on outer surfaces 89 of slots 88 when ring 50 is contracted from its normal expanded configuration. Thus, a slight clearance between inner ring surface 77 and outer shoe surface 85 is ensured during expansion or contraction of the back-up ring so that no binding friction between the shoes and the ring occurs during relative circumferential movement therebetween.

To move ring shoes 56 and 58 radially, these shoes are each provided with a pair of guide rods 90 which are fixed in bores 91 (FIGURE 6) in the central shoe members 80 by set screws 92. Guide rods 90 extend inwardly from the ring shoes into bores 94 in a central shoe guiding disc 96. Bores 94 are provided with suitable annular bushings 98 to guide shoe rods 90 in their radial sliding movement into and out of the disc.

Front and rear circumferential frame rings 100 and 102 (FIGURE 4A), respectively, are provided: to further guide the shoes in their radial sliding movement, to protect the shoes, and to furnish mounting means by which a shoe support subassembly 103, incorporating the central disc, the shoes, and the frame rings, may be mounted in the back-up expander.

As shown in FIGURES 4A, 5, 6 and 9, gusset plates 104 and cap plates 106, incorporated in subassembly 103, rigidly connect frame rings 100 and 102 to central disc 96 and form a rigid support within which the shoes may operate. To strength disc 96, parallelogram-shaped gusset plates 104 (FIGURE 9) are welded in radial planes perpendicular to the front and rear surfaces of disc 96 at positions between each shoe station. Cap plates 106 welded to gusset plates 104 and located in a plane parallel to the central disc 96 add further strength.

Each cap plate 106 is provided with four threaded bores 108 (FIGURES 5 and 6). Machine screws (not shown) extend through bores 109 in frame rings 100 and 102 to secure the rings to the cap plates. Cap plates 106 are further provided with arcuate protruding tongues 110 which cooperate with arcuate slots 112 provided in tooth-like extensions 101 of the frame rings to correctly position the rings in the shoe support subassembly 103.

The interconnecting structure of subassembly 103 is further rigidified by generally semicylindrical tube sections 114, welded on either side of each gusset plate 104 which extend between central disc 96 and cap plates 106. Tube sections 114 surround bores 116 which are located between each shoe station and extend through front frame ring 100, cap plates 106, gusset plates 104, central disc 96, and rear frame ring 102. Tube sections 114 provide passage for control wires and the like through the expander assembly.

In order to move the ring shoes radially within the subassembly 103, a pair of operating links 126 are provided for each shoe. The front and rear shoe members are each provided with a pair of lugs 120 which are through bored to receive a link pin 122 carried in a lug 124 at the shoe end of each of the operating links 126. The opposite ends of the links are pivotally connected to front and rear ball nut assemblies 128 and 130 respectively. A reversible, rotatable, operating shaft 132, which extends through a bushing 134 in the middle of central disc 96, has oppositely threaded portions 136 and 138 that cooperate with the respective ball nut assemblies to produce axial movement thereof. This axial movement of the nut assemblies is transmitted through the conically disposed links 126, causing the ring shoes to move radially outwardly to expand the back-up ring or to move radially inwardly to contract the ring.

A front bearing plate subassembly 140 (FIGURE 4A) is provided in the back-up ring assembly 24 to support the forward end of shaft 132 in a bearing 142. The bearing plate subassembly includes a front bearing plate 144 welded to a plurality of conically disposed tubes 146 which, in turn, are welded to an annular mounting flange 148 at the rear of the front bearing plate subassembly. Subassembly 140 is mounted upon the shoe support subassembly 103 by screws 150 which extend through flange 148 into threaded bores provided in front frame ring 100 of subassembly 103. Proper alignment between subassembly 140 and subassembly 103 is insured by an annular tongue 152 on the rear surface of flange 148 cooperatively engaged in an annular groove 154 provided in the front surface of front frame ring 100.

The rear end of shaft 132 is rotatably supported in a bearing 155 fixed to a rear bearing plate subassembly 156. Subassembly 156 includes a rear bearing plate 158 having welded thereto a plurality of conically disposed tubes 160 which extend longitudinally of expander 20 and are welded to an annular mounting flange 162. Flange 162 is mounted fixed to subassembly 103 by screws 164 extending through flange 162 into threaded apertures provided in rear frame ring 102. Proper alignment of subassembly 156 and subassembly 103 is ensured by engagement of an annular tongue 166 on flange 162 and an annular groove 168 in the rear surface of rear frame ring 102.

To prevent twisting of ball nut assemblies 128 and 130 during lockup at ends of ball nut travel, longitudinally disposed guide bars 170 are provided. These bars extend through bores 172 (FIGURES 6 and 10) in central disc 96 and terminate in bores in front and rear guide bar plates 174 and 176. Guide bar plates 174 and 176 are welded to the conically disposed tubes 146 and 160 of the bearing plate subassemblies at a position intermediate the operating range of the nut assemblies and the bearing plates 144 and 158.

Ring segment 64, as mentioned above, completes the circumferential contact between the back-up expander of the present invention and the inside surface of pipeline sections such as 54. Ring segment 64 is mounted upon ring segment shoe 66 by machine screws 180 threaded into suitable bores provided therein. Shoe 66 is provided with guide rods 182 which are secured therein as by setscrews (not shown). Guide rods 182 are longer than guide rods 90 of the ring shoes inasmuch as the ring segment shoe must be adapted for greater radial movement during expansion and contraction of the back-up expander, than the shoes associated with back-up ring 50. Rods 182 extend into bores 184 in central disc 96 and are slidably received therein by annular bushings 98.

Radial movement of ring segment shoe 66 is accomplished by a pair of links 186 pivotally connected at one end to ball nut assemblies 128 and 130, respectively, and pivotally connected at their opposite ends by pins 122 to lugs 188 integral with the front and rear portions of shoe 66.

To ensure expansion of the back-up ring 50 to open a gap between ends 60 and 62 thereof prior to radial outward movement of ring segment 64, each of the shoe operating links 126 and 186 is provided with a hydraulic fluid controlled piston-cylinder pump or dash pot between the pivoted ends thereof. Specifically, the ball nut end of links 126 and 186 are integral with cylinders 190 and each mounts a hydraulic conduit fitting 192 communicating with the closed end of the associated cylinder 190. The opposite, shoe connected ends of links 126 are integral with pistons 194 interfitting within cylinders 190. Pistons 194 are adapted to abut a cylinder closing ring assembly 196 to limit the movement of pistons 194 out of cylinders 190 and are further adapted to abut the closed ends of cylinders 190 to limit their movement into the cylinders. At least one of the links 186 connected to the ring segment shoe 66 is provided with a modified piston 198 which is adapted to abut the closing ring assembly 196 after a relatively short movement in cylinder 190 for purposes described below.

As shown in FIGURE 7, cylinders 190 of the pumps of links 126 and 186 are connected to an atmospheric pressure, hydraulic fluid reservoir 200 by conduits 202 and 204, respectively. Reservoir 200 includes a bleed check valve assembly 206 connected to conduit 202 and a bleed check valve assembly 208 connected to conduit 204. Check valve assembly 206 is so arranged that its ball check 210 closes to restrict flow of fluid to the reservoir from the cylinders 190 of links 126. A needle valve 212 is provided to bleed a controlled flow of hydraulic fluid around ball check 210 when the latter is closed.

The bleed check valve assembly 208, connected to the pumps in links 186 of ring segment shoe 66, has a ball check 214 arranged to restrict flow of fluid from the reservoir to the cylinders 190 of the pumps in links 186. A bleed needle valve 216 is provided to permit a controlled fluid flow around ball check 214, for purposes described below when the check is closed. Each check valve assembly 206 and 208 further includes pin-like members 218 and 220 which retain the ball checks 210 and 214 in operative positions.

As shown in FIGURES 4A, 5 and 8, back-up ring 50 and back-up ring segment 64 are each cut away on interior surfaces 77 and 222 thereof to form shallow grooves 223 and 225 which receive coolant passage closing strips 224 and 226 in flush relation with these surfaces. The ring and the ring segment are further provided with narrow circumferential coolant grooves 228 and 230, in the bottom of grooves 223 and 225; as most clearly shown in FIGURE 8, strips 223 and 225 are sealingly welded in their respective grooves to close the sealant passages. Coolant supply bores 232 are provided within the back-up ring 50 adjacent ends 60 and 62 thereof to supply coolant through metering ports 234 leading into grooves 228. A metering tube 236 is connected to the grooves 230 in ring segment 64 to supply coolant thereto. Atmospheric exhaust outlets 237 are connected to the coolant passages of the ring and ring segment at suitable locations, as shown in FIGURE 8.

Supply bores 232 and metering tube 236 are connected to a coolant reservoir 238 by a branched conduit 240. Flow through conduit 240 is controlled by a control valve 242 which is preferably solenoid operated. Reservoir 238 is maintained above atmospheric pressure by an air compressor 244 having an atmospheric inlet 246. The compressor is driven by an electric motor 248 connected to a power source (not shown) through a cable connection 250 extending out through control handle assembly 34.

Back-up ring 50 and ring segment 64 are provided with temperature sensing devices 252, which may be thermocouples, connected to a coolant control 254 which opens and closes valve 242 upon temperature increases in the back-up members. Coolant control 254 is connected to a suitable power source (not shown) through a cable 256 which also extends out through control handle assembly 34.

As shown in FIGURE 4A, coolant reservoir 238 is an annular, double-conical, sheet metal tank having a filler cap 258 at the top thereof and is secured to the back-up ring subassembly 24 by an annular flange 260 welded to a conical, sheet metal, tank extension 262. Flange 260 is secured to front frame ring 100 by screws 264 extending through the flange into threaded bores in frame ring 100.

*Front cage 28*

As shown in FIGURES 1 and 4A, a front cage 28 is provided to protect the forward end of the back-up expander, particularly coolant reservoir 238, from damage which is apt to occur as a pipeline section is being positioned over the front portion of the back-up expander protruding from the open end of the pipeline. Cage 28 includes an annularly formed rod 268 welded to a plurality of conically disposed cage bars 270 which in turn are securely welded at their rear ends to a front cage flange 272. Flange 272 is mounted upon the back-up expander by means of screws 274 extending through flange 272 into threaded bores in the coolant tank flange 260.

*Brake assembly 26*

As shown in FIGURES 1 and 4B, the brake assembly 26 employed to position back-up expander 20 in pipeline section 54 includes a plurality (ten in one specific embodiment) of shoes 280, the external surfaces of which may be lined with any standard brake lining material 282. Each shoe includes guide rods 284 which are slidably received in bushed bores 286 in a central disc 288. A front frame ring 290 and a rear frame ring 292 are rigidly connected to central disc 288 by a gusset arrangement 294 to form a shoe support subassembly 295 similar to that described above in conjunction with back-up ring subassembly 24. A welded front bearing plate subassembly 296, having a bearing plate 298, a plurality of conically disposed tubes 300, and an annular mounting flange 302 is connected to front frame ring 290 by screws (not shown) extending through flange 302 into threaded bores in frame ring 290. Subassembly 296 is accurately positioned on frame ring 290 of the shoe support subassembly 295 by an annular groove and tongue arrangement as described above in connection with the back-up ring assembly.

Mounted aft of central disc 288 is a rear bearing plate subassembly 304 which includes a rear bearing plate 306, a plurality of conically disposed brace tubes 308, and a mounting flange 310 all welded together to form a rigid structure. Flange 310 is fixed to rear frame ring 292 of the shoe support subassembly 295 by screws (not shown) extending through flange 310 into threaded bores in the frame ring. The rear bearing plate subassembly is also accurately positioned on shoe support subassembly 295 by an annular tongue and groove arrangement.

In a manner similar to that described above in conjunction with the ring subassembly, a shaft 312 having oppositely threaded portions 314 and 316 is rotatably mounted in bearing assemblies 318 and 320 positioned in bearing plates 298 and 306, respectively. Shaft 312 passes through a bushing 322 centrally located in disc 288. Ball nut assemblies 324 and 326 are operatively mounted upon threaded portions 314 and 316, respectively, and are axially guided in their movement therealong by bars 328 slidingly extending through bores (not shown) in the nut assemblies and securely mounted in rear bearing plate 306, central disc 288, and a guide bar support plate 330 which is welded to the conically disposed tubes 300 of the front bearing plate assembly.

A plurality of rigid links 332, pivotally connected to each of two ball nut assemblies 324 and 326, are generally conically disposed about shaft 312. Their outer ends are pivotally connected to brake shoes 280. Thus, as shaft 312 rotates in one direction, the solid links 332 effect radial outward movement of the brake shoes into gripping engagement with pipeline section 54; conversely, rotation of the shaft in the opposite direction effects radial inward movement of the shoes, freeing back-up expander 20 for movement along the pipeline.

Brake assembly 26 also includes a guide wheel 333 rotatably mounted on links 334 which are pivoted at 335 to a wheel frame 336 rigidly secured to the rear bearing plate subassembly 304. A pair of compression coil springs 337 are disposed between links 334 and adjustable studs 338 to resiliently urge wheel 333 into contact with interior surfaces of the pipeline. An adjustable stud or screw 339 is provided to limit the outward swing of links 334 when the back-up expander is not within a pipeline. The spring loaded guide wheel 333 serves to steady the back-up expander within the pipeline when the brake shoes are in a collapsed position.

At the rear of the brake subassembly, an enclosing protective sheet metal cone 340 is suitably connected to rear frame ring 292 and to rear bearing plate 306 by annular flanges 341 and 342, respectively.

*Central body portion 22*

As shown in FIGURES 1, 4A and 4B central body portion 22 of back-up expander 20 includes a framework 343 interconnecting back-up ring assembly 24 and the brake assembly 26. Interconnecting frame 343 includes a plurality of generally cylindrically disposed frame tubes 344 rigidly connected by welding to front frame flange 345 and to a rear frame flange 346. The frame flanges are connected by screws such as 348 extending through frame flanges 345 and 346 into threaded bores in the rear frame ring 102 of the back-up ring assembly and front frame ring 290 of the brake assembly.

A protective cylindrical sheet metal covering 350 is secured around the central body portion 22 by a suitable attachment (not shown) adjacent the frame rings 102 and 290.

The central body portion 22 of the back-up expander houses electric motors 352 and 354 which drive the shafts 132 and 312 described above through disc-type slip clutches 356 and 358. The clutches prevent stalling overloads in the motors and may be set to suitably control the expansion forces applied to the shoes of the back-up ring assembly and the brake assembly. Back-up ring motor 352 drives shaft 132 through clutch 356 and a gear train including intermeshed pinions 360, 362 and 364, the latter being fixed to an extension of shaft 132 and mounted in a bearing assembly 366. Brake motor 354 drives shaft 312 through clutch 358 and an intermediate gear box 368. The details of these two drive trains are not critical and may be varied as desired. An elaborate description of the components of these two drive trains is therefore deemed unnecessary.

Central body portion 22 mounts a lift ring subassembly 370 which includes a ring 372 selectively engaged in one of a plurality of notches 374 (FIGURE 4B) provided in the subassembly. Lift ring subassembly 370 is welded to the longitudinally disposed frame tubes 344 and provides a suitable balanced attachment point for handling the back-up expander by a crane when it is outside of a pipeline.

To enable the back-up expander 20 to be rolled along the interior of the pipeline, two sets of the wheels 32 referred to above are provided at circumferentially spaced positions angularly offset from the vertical longitudinal center plane of the back-up expander. These wheels are rotatably mounted upon wheel mounts 376 which are rigidly connected to frame tubes 344. Wheels 32 protrude through apertures 378 in sheet metal shell 350.

Rear cage 30

To protect the rear end of the back-up expander 20 from blows which may be received, for example, when the back-up expander is inserted in the open end of a pipeline preparatory to use, a rear cage 30 is provided. This cage includes an annularly configured rod 388, a plurality of conically disposed rods 390, and an annular terminal flange 392 all rigidly interconnected by welding. Terminal flange 392 is secured to rear frame ring 292 by screws (not shown) extending through the flange into threaded bores in the frame ring.

Control handle assembly 34

As seen in FIGURES 1 and 4A, the control handle assembly 34 includes a pair of vertically disposed plates 410 rigidly secured to a protective cap member 412 which is attached to front bearing plate 144. A gimbal ring 414 is horizontally pivoted at the front ends of plates 410; and it, in turn, pivotally mounts the horizontal plates 416 of a yoke 418 connected to the rear end of the tubular main member 420 of handle assembly 34. Tubular member 420 is preferably jointed so that it may be made up in various lengths as desired, but it may be as long as 40 feet for use with pipe sections of that approximate length.

The various control conduits and connections (not shown) in tubular member 420 extend through yoke 418, gimbal ring 414, a bore 422 (FIGURE 4A) in front bearing plate 144, and into the interior of the back-up expander.

At the extreme forward end of handle assembly 34 a smoothly contoured knob-like member 424 is provided so that handle assembly 34 may slide easily along the interior surface of a pipe section being positioned adjacent the open pipeline end without snagging on the pipe section or damaging the plug connection 40.

Operation

Back-up expander 20 may be connected by ring 372 to a suitable piece of lifting equipment such as a crane. The expander is positioned by the lifting equipment wtih its rear end adjacent the open end of a partially completed pipeline and then inserted therein. Wheels 32 and 336 contact the interior cylindrical surface of the pipeline and permit the back-up expander to be rolled therealong so that back-up ring 50 can be positoned adjacent the end of the pipeline with groove 73 directly under the weld to be made.

When the back-up expander is so positioned, brake motor 354 is actuated from power control box 36, rotating shaft 312 and causing ball nut assemblies 324 and 326 to move axially toward each other. Solid links 332 translate this axial movement into radial movement and cause an outward radial movement of each of the brake shoes 280 so that the brake linings 282 thereof are firmly pressed into engagement with the interior surface of the pipeline with a force that may be controlled by the setting of slip clutch 358 or controlled in accordance with the torque on motor 354 as indicated by electric meters on control box 36. The expansion of the brake shoes centers back-up expander coaxially in the pipeline and lifts wheels 32 out of engagement with interior surface.

The pipe line section 430 to be joined to pipeline section 54 is then slipped over control handle assembly 34 (control box 36 may be temporarily disconnected therefrom) and positioned adjacent the open end of pipeline 52. When section 430 is properly positioned, the back-up ring motor 352 is actuated, rotating shaft 132 and moving ball nut assemblies 128 and 130 toward each other. This axial movement is translated by the fully extended links 126 into radial movement, causing shoes 56 and 58 to move outwardly against the resilient, expandable back-up ring 50. During this phase of the expansion cycle, the rollers 76 mounted on back-up ring 50 roll along surface 89 of slots 88 to provide clearance between the shoes and the back-up ring and facilitate relative tangential movement therebetween.

After engagement of the back-up ring with the inner pipeline surface, the link assemblies 126 are subjected to a compressive load which tends to force hydraulic fluid therefrom. However, bleed check valve 206 restricts such flow to the amount of bleed flow past needle valve 212. The resulting hydraulic pressure in the link assemblies 126 tends to maintain back-up ring 50 in firm contact with the interior surface of the pipeline during this second phase of the expansion cycle of the mechanism.

Upon initial actuation of the back-up ring assembly, inertia, friction, and gravity all tend to maintain ring segment 64 and its associated shoe 66 in their respective contracted positions. Since extended ring segment links 186 are free to exhaust hydraulic fluid to reservoir 200 through bleed check valve 208, initial movement of the ball nut assemblies is merely effective to collapse the piston-cylinder arrangement of links 186. Thus, during the initial phase of the expanding cycle in which back-up ring 50 moves to an expanded position, the ring segment 64 is stationary.

During a second phase of the expanding cycle, in which hydraulic pressure is applied to the back-up ring as described above, the now fully collapsed links 186 translate further axial movement of the nut assemblies into radial movement to move ring segment shoe 66 radially outwardly, moving ring segment 64 into the gap opened between the ends 60 and 62 of the back-up ring during the first phase of the expansion cycle.

At approximately the same time that ring segment 64 contacts the interior surface of the pipeline, the pistons 194 of the hydraulic motors of ring links 126 bottom at the end of their associated cylinders 190. Thereafter, the ring shoes and the ring segment shoe all are forced radially outwardly an amount controlled by the setting of slip clutch 356 or controlled in accordance with the electrical load on the actuating motor as indicated by meters provided in control box 36. In this last phase of the expansion cycle, the ends of the pipeline and the pipe sections are shaped into circles, are slightly expanded to insure perfect sized alignment for the welding procedure and are securely clamped in this aligned position. In one specific embodiment, the entire expansion cycle described above is completed in 25 to 30 seconds.

During the welding operation, which is preferably carried out by the novel arc welding machine disclosed in copending application No. 266,292, filed March 19, 1963, by Augustine J. Pagan for Arc Welding Apparatus and Method, the temperature sensitive devices 252 located in back-up ring 50 and in ring segment 64 sense temperature increases therein due to contact of the molten pool of weld metal with groove 73 in the ring and ring segment. Sufficient temperature increases at thermocouples 252 actuates control 254 which opens valve 242, allowing pressurized coolant, which may be water, to pass from reservoir 238 to the coolant passages in the ring and the ring segment. The coolant turns to steam within the ring and ring segment and is exhausted therefrom through exhaust passages 237, thus effecting a cooling of the weld back-up members. By this method, the back-up ring and ring segment are kept at a sufficiently low temperature that there will be no adhesion of the weld metal to the back-up members.

After the weld has been completed, back-up motor 352 is actuated in a reverse direction to contract the back-up ring assembly 24 which cycle may also require 25 to 30 seconds, in one specific embodiment. During a first phase of the contracting cycle, the ring segment shoe 66 is forced to move radially inwardly as the ball nut assemblies move apart since hydraulic fluid flow to the collapsed links 186 is restricted by the now closed ball check 214 to a small bleed flow permitted by needle 216. Thus, ring segment 64 is immediately withdrawn from contact with the interior surface of the pipeline. Back-up ring 50 remains in its expanded position because of its resiliency and because free flow of hydraulic fluid to links 126 through check valve assembly 206 allows links 126 to merely extend upon initial outward axial movement of the ball nut assemblies.

At the completion of this initial phase of the contracting cycle, the ring segment 64 is radially clear of the ring and the ring links 126 are fully extended so that further axial movement of the nut assemblies force moves the ring shoes radially inward. During the final phase of the contracting cycle, the back-up ring is contracted to the position shown in FIGURE 2; and segment links 186 are extended to the position shown in FIGURE 4A after inward radial movement of ring segment shoe 66 is stopped by abutment with central disc 96.

After contracting the back-up ring assembly 24, the brake assembly 26 may be released by reverse rotation of shaft 312, and the back-up expander may be rolled through pipeline section 430 to the new open end of the pipeline by handle subassembly 34.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An internal pipe alignment device comprising:
   a. a C-shaped ring;
   b. means for expanding said ring into engagement with the inside of a pipe;
   c. a ring segment dimensioned to fit between the ends of said C-shaped ring after the latter is expanded; and
   d. means for moving said segment into position between said ring ends after the ring is expanded.

2. An internal back-up expander for aligning and clamping adjacent ends of pipe sections to be joined, comprising:
   a. a unitary, flexible, clamping ring adapted to fit within the pipe sections;
   b. means for radially and circumferentially expanding said ring into clamping engagement with the interior surfaces of the pipe sections, said means including a plurality of radially movable shoes engageable with said ring;
   c. said shoes including arcuate slots; and
   d. said ring including a plurality of rollers engaged in said slots to facilitate tangential motion between said ring and said shoes.

3. A back-up expander for aligning and clamping the ends of adjacent pipeline sections preparatory to welding and for providing a backing support for molten weld metal introduced therebetween, comprising:
   a. a substantially closed, C-shaped ring dimensioned to fit within the pipeline sections;
   b. means for expanding and opening said C-shaped ring to bring said ring into rigid circumferential contact with the interior surfaces of said pipeline sections at the ends thereof;
   c. a ring segment adapted to fit closely within a gap formed in said C-shaped ring during expansion and opening thereof; and
   d. means for positioning said ring segment in the gap after opening of said ring to provide substantially complete circumferential contact of said back-up expander with the interior surfaces of said pipeline sections.

4. A pipe line welding back-up device, comprising:
   a. flexible, split ring chilling means dimensioned in a normal condition to fit within a pipeline;
   b. means for flexing said chilling means from its normal condition into circumferential, heat conducting, weld-metal-supporting contact with the interior surface of said pipeline;
   c. said split ring chilling means comprising a metallic bar disposed in a circular configuration and having enclosed, circumferential fluid conducting passages therein;
   d. a cooling fluid reservoir;
   e. conduit means connecting said reservoir to the passages of said ring means;
   f. valve means in said conduit means to regulate flow therethrough; and
   g. control means sensitive to the temperature of said ring means for increasing the flow of cooling fluid through said passages upon an increase in the temperature of said ring means.

5. A pipeline welding back-up device, comprising:
   a. flexible, split ring chilling means dimensioned in a normal condition to fit within a pipeline;
   b. means for flexing said chilling means from its normal condition into circumferential, heat conducting, weld-metal-supporting contact with the interior surface of said pipeline; and
   c. said split ring chilling means comprising a metallic bar, composed of a plurality of laminations, disposed in a circular configuration and having enclosed, circumferential fluid conducting passages therein.

6. In an internal pipeline end aligning and weld back-up device having an expansible end aligning and weld back-up ring, a plurality of ring-connected links, and actuating means for coordinately operating said links to expand and contract said ring expansion sequence control means comprising:
   a. fluid operated means incorporated in said links for changing the operative length thereof; and
   b. fluid flow control means operatively connected to the fluid operated means in said links for controlling the sequence in which said links are extended to expand said ring.

7. The device as defined in claim 6, wherein:
   a. said links are disposed in a generally conical pattern about an axis normal to and in the center of said ring and are connected at their apex ends to said link actuating means; and
   b. said link actuating means includes means mounted for axial movement to extend said links and thereby expand said ring.

8. The device as defined in claim 6, wherein said flow control means includes:
   a. reservoir of hydraulic fluid; and
   b. valve assemblies connecting said reservoir to the respective links of the said fluid operated means to provide different flow rates of said fluid to and from said links upon operation of said actuating means.

9. A pipe line welding back-up device as defined in claim 6, including means for circulating a cooling fluid in heat absorbing relation with said ring during a welding operation.

10. A circular internal expander for aligning and clamping adjacent ends of pipeline sections to be joined comprising:
  a. normally substantially closed, C-shaped, ring means adapted to fit within the pipeline sections;
  b. a plurality of radially movable shoes adapted to slidingly contact said ring means to expand and open said ring means into circumferential contact with the interior surfaces of the pipeline sections at the ends thereof;
  c. a ring segment securely mounted on a radially movable shoe for movement from a position radially within said normally substantially closed, C-shaped, ring means to a position closing a gap formed when said ring means is expanded and opened by said radially movable shoes to complete the circumferential contact between said expander and the pipeline sections;
  d. an actuator mounted for movement along axis centrally of and normal to said ring means;
  e. a plurality of links each pivoted at one end to said actuator to cause radial movement of said shoes upon axial movement of said actuator;
  f. hydraulic motors in said links for increasing the operative length thereof upon flow of fluid thereto;
  g. a hydraulic fluid reservoir having connections to the respective motors of said links for reversible fluid flow therebetween; and
  h. fluid flow control means in said connections to restrict fluid flow from the motors of the links associated with said ring means and to facilitate fluid flow from the motors of the links associated with said ring segment to accelerate radial expansion of said ring means and to retard the radial expansion of said ring segment upon an expanding operation of said link actuator.

11. The expander as defined in claim 10, including rollers separating said ring from said shoes to permit relative movement therebetween.

12. A circular internal expander as defined in claim 10, wherein said fluid flow control means includes valves effective upon a collapsing operation of said link actuator to restrict fluid flow to the motors of the links associated with said ring segment and to facilitate fluid flow to the motors of the links associated with said ring means to accelerate inward radial movement of said ring segment and to retard inward radial movement of said ring means.

References Cited by the Examiner

UNITED STATES PATENTS

| | | | |
|---|---|---|---|
| 1,733,957 | 10/1929 | Freedman | 277—147 |
| 2,594,000 | 4/1952 | Elliott | 269—48.1 |
| 2,613,303 | 10/1952 | Babbitt | 228—50 |
| 2,878,770 | 3/1959 | Work et al. | 269—48.1 |
| 2,887,972 | 5/1959 | Handley | 228—50 |
| 3,165,082 | 1/1965 | Baker | 228—50 |

JOHN F. CAMPBELL, *Primary Examiner.*

WHITMORE A. WILTZ, M. L. FAIGUS,
*Assistant Examiners.*